(12) United States Patent
Hong

(10) Patent No.: US 6,997,228 B2
(45) Date of Patent: *Feb. 14, 2006

(54) LAMINATION APPARATUS FOR AUTOMATED MANUFACTURING SYSTEM OF LITHIUM SECONDARY BATTERY

(75) Inventor: Ji-Jun Hong, Nonsan-si (KR)

(73) Assignee: EagelPicher Kokam Co., Ltd., Kyounggi-Do (KR)

( * ) Notice: Subject to any disclaimer, the term of this patent is extended or adjusted under 35 U.S.C. 154(b) by 66 days.

This patent is subject to a terminal disclaimer.

(21) Appl. No.: 10/478,539

(22) PCT Filed: May 17, 2002

(86) PCT No.: PCT/KR02/00933

§ 371 (c)(1),
(2), (4) Date: Nov. 19, 2003

(87) PCT Pub. No.: WO02/095844

PCT Pub. Date: Nov. 28, 2002

(65) Prior Publication Data

US 2004/0163237 A1 Aug. 26, 2004

(30) Foreign Application Priority Data

May 23, 2001 (KR) ................ 2001-28494

(51) Int. Cl.
B32B 31/20 (2006.01)
(52) U.S. Cl. .............. 156/552; 156/564; 156/565
(58) Field of Classification Search ........ 156/443, 156/459, 461, 464, 564, 565; 29/730, 731, 29/623.1, 623.2, 623.3, 623.4, 623.5
See application file for complete search history.

(56) References Cited

U.S. PATENT DOCUMENTS 3,442,717 A 5/1969 Horn et al.
3,723,181 A 3/1973 Oakley et al.

(Continued)

FOREIGN PATENT DOCUMENTS

EP 1 261 063 A2 11/2002

(Continued)

OTHER PUBLICATIONS

International Search Report—PCT/KR02/000933.

*Primary Examiner*—George Koch
(74) *Attorney, Agent, or Firm*—Welsh & Katz, Ltd.

(57) ABSTRACT

A lamination apparatus for an automated manufacturing system of a secondary lithium battery is disclosed. The lamination apparatus comprises: a frame; a stacking member provided with a plurality of positive-electrode-plate storing portions each of which a multitude of positive electrode plates are stored in, and which are disposed equidistantly, and a plurality of negative-electrode-plate storing portions each of which a multitude of negative electrode plates are stored in, and which are disposed equidistantly, and are installed at the frame to be asymmetrical to the positive-electrode-plate storing portions about a separator to which adhesive has been applied to in a predetermined pattern; pairs of pivoting members installed at the frame to pivot so as to face the positive-electrode-plate storing portions and the negative-electrode-plate storing portions, respectively; and pushing members installed to be linearly movable with respect to the respective pivoting members so as to approach the stacking member and the separator to attach the positive electrode plates and the negative electrode plates which are stored in the stacking member to the separator.

6 Claims, 4 Drawing Sheets

U.S. PATENT DOCUMENTS 4,216,579 A * 8/1980 Murata et al. ................ 29/730
2002/0007552 A1 * 1/2002 Singleton et al. .......... 29/623.3

FOREIGN PATENT DOCUMENTS

| | | |
|---|---|---|
| JP | 01-122571 A | 5/1989 |
| JP | 05-074446 A | 3/1993 |
| JP | 10-255812 A | 9/1998 |
| JP | 10-321259 A | 12/1998 |
| JP | 11-339852 A | 12/1999 |
| JP | 12-012085 A | 1/2000 |
| JP | 12-294269 A | 1/2000 |
| JP | 12-173577 A | 6/2000 |

* cited by examiner

LAMINATION APPARATUS FOR AUTOMATED MANUFACTURING SYSTEM OF LITHIUM SECONDARY BATTERY

BACKGROUND OF THE INVENTION

1. Field of the Invention

The present invention relates to a lamination apparatus for an automated manufacturing system of a lithium secondary battery, and more particularly, to a lamination apparatus for an automated manufacturing system of a lithium secondary battery capable of laminating a batch of positive electrode plates and negative electrode plates stored in magazines on both surfaces of a predetermined length of separator in the form of film arranged to travel along a horizontal path.

2. Description of the Related Art

In general, as portable electronic products such as video cameras, portable phones, and portable PCs become lighter, or highly functional, various development and research have been focused on batteries used as power sources of such portable electronic products. Such batteries can be used continuously by recharging the batteries.

Among various batteries, usually, nickel cadmium batteries, nickel hydrogen batteries, nickel zinc batteries, lithium secondary batteries and the like are used as power sources of electronic products, and, in particular, lithium secondary batteries are generally used taking into consideration the use life and capacity thereof.

According to types of electrolyte, the lithium secondary batteries are classified into lithium metal batteries and lithium ion batteries which employ liquid electrolyte, and lithium polymer batteries which employ solid polymer electrolyte. According to types of solid polymer electrolyte, the lithium polymer batteries are classified into full-solid type lithium polymer batteries in which organic electrolytic liquid is not included at all, and lithium ion polymer batteries employing gel type polymer electrolyte containing organic electrolytic liquid.

The lithium secondary battery is manufactured by stacking a plurality of unit cells having a separator-electrode structure so as to meet a required capacity, connecting the unit cells to each other in parallel, and packing the unit cells into a cylindrical or polyhedral can.

However, in a battery in which electrode plates are disposed according to a conventional method, there is a problem in which when the battery is overcharged, a voltage of the battery rises drastically, and the energy of the battery may be instantaneously discharged and the electrolyte may evaporate or burn, and therefore the performance of the battery and safety thereof deteriorate. In addition, there is another problem in which the process of attaching electrode taps for electrically connecting unit cells to each other is very complicate.

SUMMARY OF THE INVENTION

To solve the above-described problems, it is an objective of the present invention to provide a lamination apparatus for an automated manufacturing system of a secondary battery having an improved structure capable of simultaneously and periodically laminating, batch by batch, positive electrode plates and negative electrode plates having a predetermined size to both surfaces of a separator in the form of film instead of sequentially laminating a plurality of positive electrode plates to one surface of a separator, and sequentially laminating a plurality of negative electrode plates to the other surface of the separator in a conventional art.

Accordingly, to achieve the above objectives, there is provided a lamination apparatus for an automated manufacturing system of a secondary lithium battery comprising: a frame; a stacking member provided with a plurality of positive-electrode-plate storing portions each of which a multitude of positive electrode plates are stored in, and which are disposed equidistantly, and a plurality of negative-electrode-plate storing portions each of which a multitude of negative electrode plates are stored in, and which are disposed equidistantly, and are installed at the frame to be asymmetrical to the positive-electrode-plate storing portions about a separator to which adhesive has been applied to in a predetermined pattern; pairs of pivoting members installed at the frame to pivot so as to face the positive-electrode-plate storing portions and the negative-electrode-plate storing portions, respectively; and pushing members installed to be linearly movable with respect to the pivoting members so as to approach the stacking member and the separator, respectively, to attach the positive electrode plates and the negative electrode plates which are stored in the stacking member to the separator.

In the lamination apparatus for an automated manufacturing system of a secondary lithium battery, the stacking member further comprises pressing means for pressing the positive electrode plates and the negative electrode plates which are stored in the positive-electrode-plate storing portions and the negative-electrode-plate storing portions, respectively, against the respective pivoting members.

In the lamination apparatus for an automated manufacturing system of a secondary lithium battery, each of the pressing means comprises: an elongated hole provided at each of the positive-electrode-plate storing portions and the negative-electrode-plate storing portions; and a pressing plate which has a pressing projection to be inserted into the elongated hole, and is installed at the frame to be linearly moved by a moving member.

In the lamination apparatus for an automated manufacturing system of a secondary lithium battery, each of the pressing means further comprises an elastic member installed at the pressing projection so as to give an elastic force to corresponding one of the positive electrode plates and the negative electrode plates.

In the lamination apparatus for an automated manufacturing system of a secondary lithium battery, each of the pushing members further comprises a cushion member which corresponds to one of the positive electrode plates and the negative electrode plates, and is provided with a passage communicating with an absorbing member so as to hold the corresponding electrode plate stored in the stacking member with an absorbing force, and so as to attach to the separator.

The lamination apparatus further comprises aligning members installed to be linearly movable with respect to the stacking member so as to align the positive electrode plates or the negative electrode plates stored in the stacking member.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Now, a lamination apparatus for an automated manufacturing system of a lithium secondary battery according to a preferred embodiment of the present invention will be described in detail with reference to the attached drawings.

Figure 1:
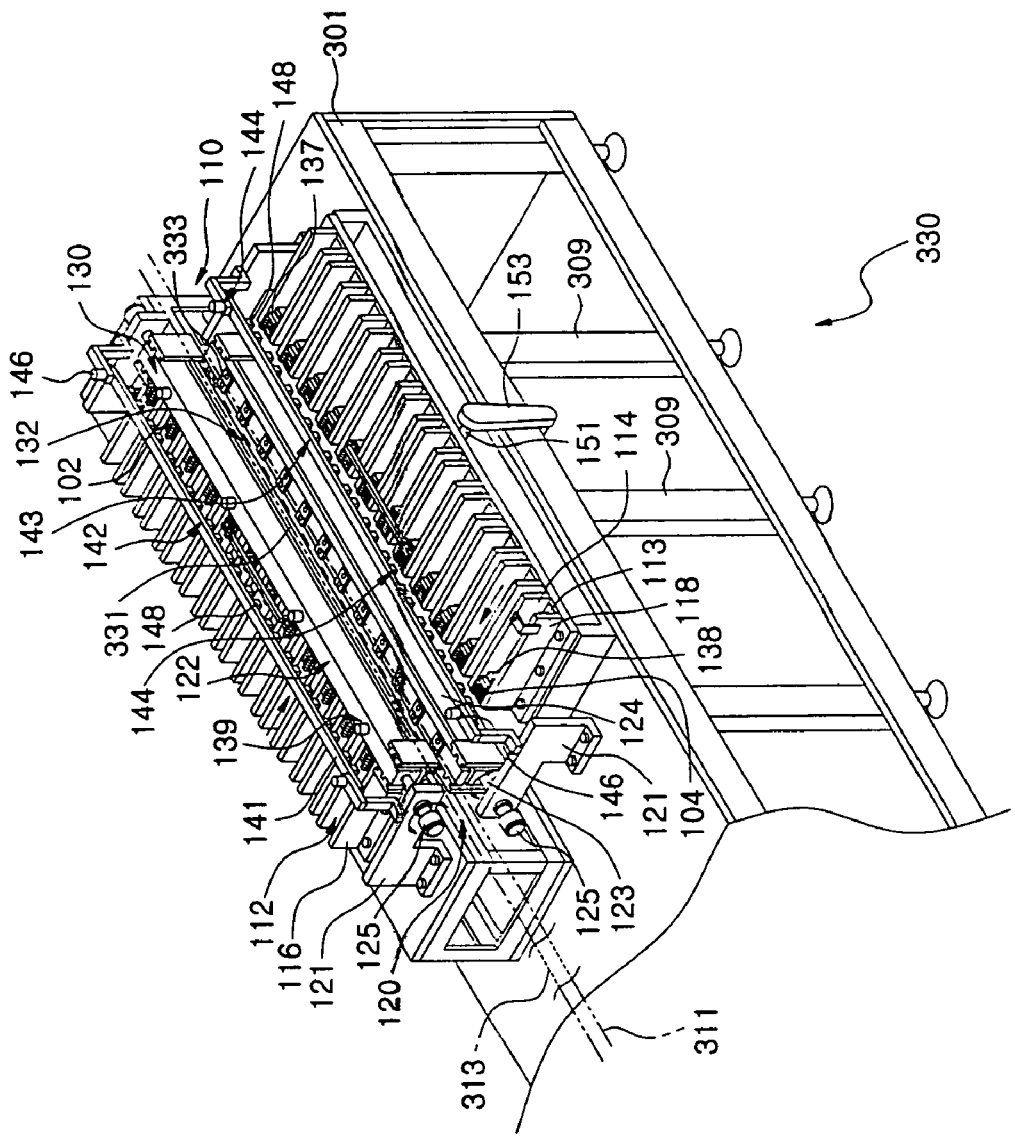
FIG. 1 is a schematic perspective view illustrating a lamination apparatus for an automated manufacturing system of a lithium secondary battery according to a preferred embodiment of the present invention.
Figure 2:
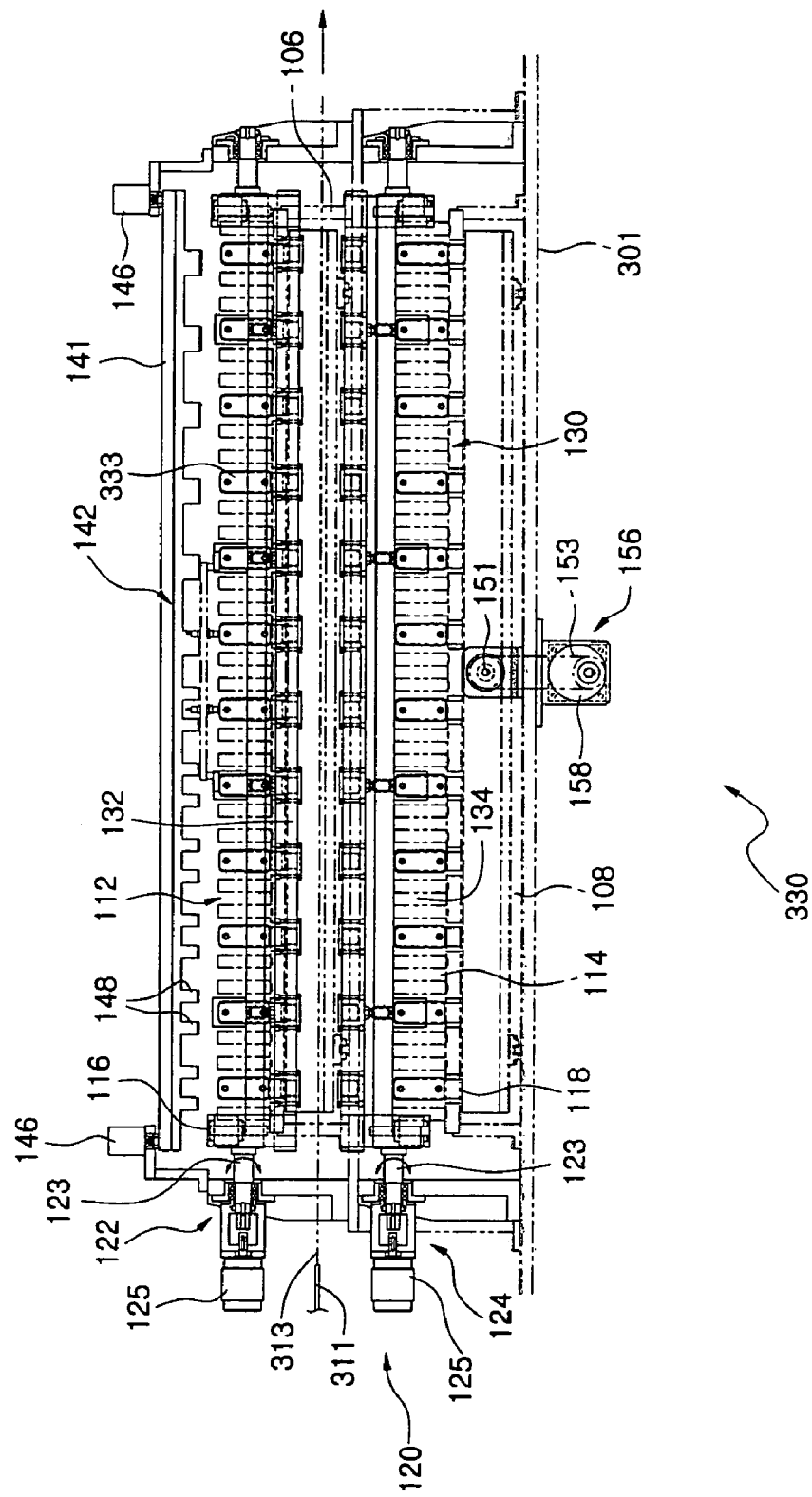
FIG. 2 is a front view of the lamination apparatus shown in FIG. 1.
Figure 3:
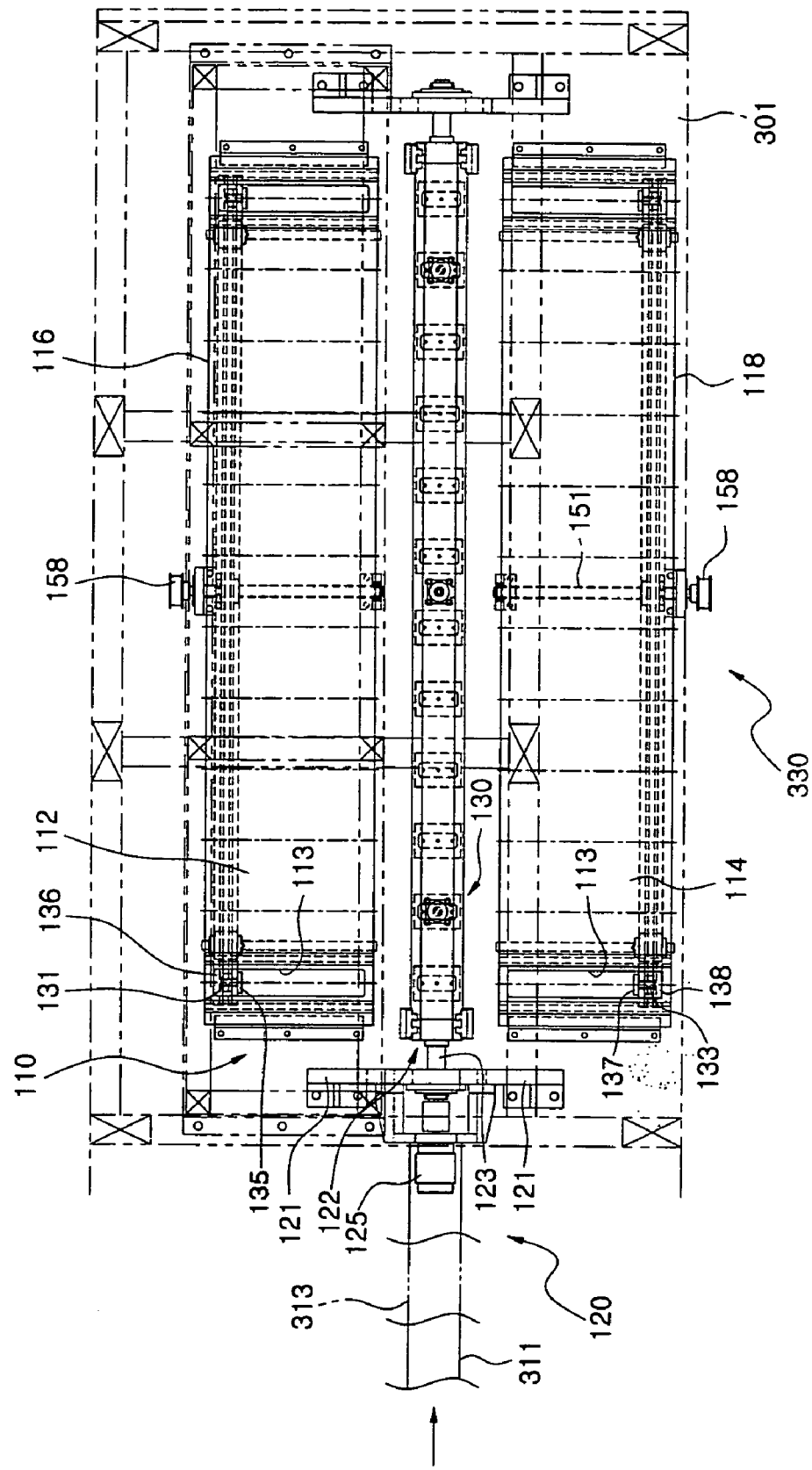
FIG. 3 is a plan view of the lamination apparatus shown in FIG. 1.
Figure 4:
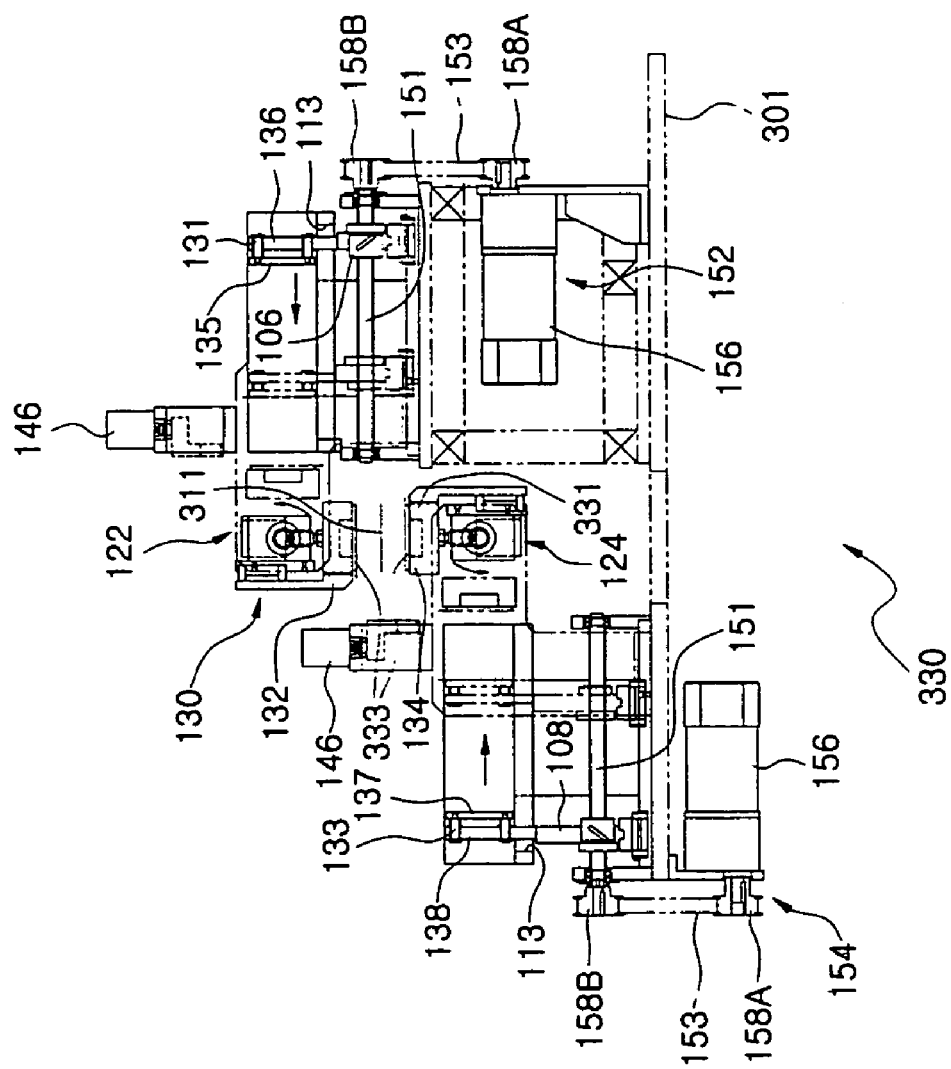
FIG. 4 is a right side view of the lamination apparatus shown in FIG. 1.

Referring to FIGS. 1 through 4, a lamination apparatus 330 is intended to simultaneously attach and laminate a batch of positive electrode plates and negative electrode plates to two respective surfaces of a separator 311, to which adhesive has been applied in a predetermined pattern, so that the electrode plates correspond to the predetermined pattern, while the separator 311 can be released from a separator roller (not shown) and travel along a travel path 313.

The lamination apparatus 330 comprises a frame 301, a stacking member 110 provided with a plurality of positive-electrode-plate storing portions 112 each of which a multitude of positive electrode plates are stored in, and a plurality of negative-electrode-plate storing portions 114 each of which a multitude of negative electrode plates are stored in, which, i.e., the portions 112 and the portions 114, are disposed to be asymmetrical about the separator 311, a pivoting member 120 comprised of positive-electrode-plate pivoting members 122 and negative-electrode-plate pivoting members 124 which are installed at the frame 301 to be pivotable so as to face the positive-electrode-plate storing portions 112 and the negative-electrode-plate storing portions 114, respectively, and a pushing member 130 comprising positive-electrode-plate pushing members 132 and negative-electrode-plate pushing members 134 which are installed to be linearly movable with respect to the respective positive-electrode-plate pivoting members 122 and the respective negative-electrode-plate pivoting members 124 so that the positive electrode plates 102 and the negative electrode plates 104 which are stored in the stacking member 110 can be attached and laminated to the separator 311, respectively.

The frame 301 may be divided into a lower frame at which a plurality of supporting pillars 309 for supporting the apparatus 330 apart from a floor are installed, and an upper frame on which components of the apparatus 330 are seated. Various driving motors, a vacuum system, an air system, an electronic system, an adhesive supplying system, and the like are provided at the lower frame. It is preferable that the upper surface of the upper frame is arranged to be in an accurately horizontal state.

Here, the separator 311 is intended to electrically insulate the positive electrode and the negative electrode from each other in a battery, and it is preferable that the separator 311 having a single-layered or multi-layered structure is made of a porous polymeric film of polyethylene (PE) or polypropylene (PP). The width and thickness of the separator 311 may vary with the type of finally produced battery.

A supply unit (not shown) for periodically supply the separator 311 to the apparatus 330 at a predetermined speed and an adhesive applying unit (not shown) for applying adhesive to both surfaces of the separator 311 in a predetermined pattern by an air injector (not shown) or the like, are provided at the upstream side frame 301.

A packing unit (not shown) for folding and packing a batch of the separator which is laminated with the electrode plates by the lamination apparatus 330 in a predetermined pattern and an unloading unit (not shown) for unloading the packed separator to a tray unit (not shown) are provided at the downstream side frame 301.

The stacking member 110 is a storage place for arranging and storing positive electrode plates and negative electrode plates so that the positive electrode plates and the negative electrode plates which are required for a battery, (for example, when 5 positive electrode plates are required for a battery, 6 negative electrode plates are disposed so that one more negative electrode plate can be attached to a separator), can be attached to a separator simultaneously, and is divided into a positive-electrode-plate magazine 116 and a negative-electrode-plate magazine 118 for storing positive electrode plates and negative electrode plates, respectively. The positive-electrode-plate magazine 116 and the negative-electrode-plate magazine 118 are asymmetrically disposed with respect to the horizontal travel path 313 of the separator 311. That is, when the positive-electrode-plate magazine 116 is positioned at a first step, the negative-electrode-plate magazine 118 is positioned at a second step. As a matter of course, the opposite is possible. Though the positions thereof and the facing directions thereof are different from each other, the positive-electrode-plate magazine 116 and the negative-electrode-plate magazine 118 have the same structure. The positive electrode plate 102 is a standardized product made by applying a positive active material such as $LiCO_2$, or $LiMn_2O_2$ having a spinel structure or a layered structure to the surface of a metal plate such as an aluminium foil, drying the applied positive active material, cutting the metal plate into pieces of a predetermined size, and providing a positive tab at a predetermined position. The negative electrode plate 104 is a standardized product made by applying a negative active material such as a graphite material or a carbon material processed to have electrochemical characteristics, for example, mesocarbon microbeads, and meso-phase pitch carbon film to the surface of a metal plate such as a copper foil, drying the applied negative active material, cutting the metal plate into pieces of a predetermined size, and providing a negative tab at a predetermined position.

The positive-electrode-plate magazine 116 and the negative-electrode-plate magazine 118 in which a plurality of standardized positive electrode plates and a plurality of standardized negative electrode plates are stored respectively are provided with twelve positive-electrode-plate storing portions 112 and twelve negative-electrode-plate storing portions 114 which are disposed to be equidistant from each other by taking into consideration the thickness of the positive and negative electrode plates and the length of folded portion of the separator when the separator is folded in the shape of "Z". At the bottoms of the positive-electrode-plate storing portions 112 and the negative-electrode-plate storing portions 114, respective elongated holes 113 are formed. Positive-electrode-plate pressing projections 136 of positive-electrode-plate pressing plates 106 installed at the frame 301 to be linearly movable are inserted into respective elongated holes 113, and negative-electrode-plate pressing projections 138 of negative-electrode-plate pressing plates 108 installed at the frame 301 to be linearly movable are inserted into respective elongated holes 113. The elongated holes 113 and the pressing projections 136 and 138 constitute pressing means for pressing the positive-electrode-plates and the negative-electrode-plates which are stored in the respective positive-electrode-plate storing portions 112 and the respective negative-electrode-plate storing portions 114 toward the travel path 313.

The pressing means further comprise positive-electrode-plate elastic members 131 and negative-electrode-plate elastic members 133. The elastic members 131 and 133 are intended to elastically press to the positive electrode plates 102 and the negative electrodes plates 104 which are stored in the positive-electrode-plate storing portions 112 and the negative-electrode-plate storing portions 114, and are installed at the pressing projections 136 and 138. The elastic members 131 and 133 comprise pressing plates 135 and 137 installed to contact a positive electrode plate 102 and a negative electrode plate 104, respectively, guide rods interposed between the pressing plates 135 and 137 and the pressing projections 136 and 138, and springs installed at the outer circumferential surfaces of the guide rods.

The positive-electrode-plate magazine 116 and the negative-electrode-plate magazine 118 further comprise a positive-electrode-plate aligning member 142 and a negative-electrode-plate aligning member 144 which are installed to be linearly movable with respect to the stacking member 110 so as to selectively align positive electrode plates 102 or negative electrode plates 104.

The positive-electrode-plate aligning member 142 and the negative-electrode-plate aligning member 144 comprise a positive-electrode-plate aligning bar 141 and a negative-electrode-plate aligning bar 143 which are disposed to have a predetermined space from and to be parallel to the respective leading ends of the magazines 116 and 118, and are moved upward and downward by aligning cylinders 146, and a plurality of aligning projections 148 installed at the positive-electrode-plate aligning bar 141 and the negative-electrode-plate aligning bar in the lengthwise directions thereof so as to contact both edges of the positive electrode plates 102 and the negative electrode plates 104. It is preferable that a touch pad made of a soft material is installed at the leading end of the aligning projection 148 so as to not damage the positive electrode plate 102 or the negative electrode plate 104.

The positive-electrode-plate pressing plate 106 and the negative-electrode-plate pressing plate 108 are linearly moved with respect to the frame 301 by a positive-electrode-plate moving member 152 and a negative-electrode-plate moving member 154, respectively. Each of the plate moving members 152 and 154 comprises a pair of timing pulleys 158 comprising a timing pulley 158A provided at the rotating shaft of a motor 156 which is installed at the frame 301 and is controlled by the control unit, a timing pulley 158B provided at one end of a ball screw 151 which is installed at the frame 301 through the pressing plates 106 and 108 to be rotatable, and a timing belt 153 for connecting the timing pulleys 158A and 158B.

The pivoting member 120 pivots at an angle of 900 between the travel path 313 and the positive-electrode-plate magazine 116 and the negative-electrode-plate magazine 118. Each of the positive-electrode-plate pivoting members 122 and the negative-electrode-plate pivoting members 124 comprises a bracket 121 installed at the frame 301, a rotary shaft 123 installed at the bracket 121 to be parallel to the travel path 313, and a cylinder 125 which is installed at the bracket 121 to rotate the rotary shaft 123 at an angle of 90° and is controlled by the control unit.

The positive-electrode-plate pushing members 132 and the negative-electrode-plate pushing members 134 are installed to be linearly movable with respect to the positive-electrode-plate pivoting members 122 and the negative-electrode-plate pivoting members 124 so that the pushing members 132 and 134 can approach or be separated from the stacking member 110 and the separator 311, and, therefore, can hold a batch of positive electrode plates 102 and negative electrode plates 104 which are stored in the positive-electrode-plate magazine 116 and the negative-electrode-plate magazine 118 by using respective absorbing forces, and attach the electrode plates 102 and 104 to both surfaces of the separator 311.

Each of the positive-electrode-plate pushing members 132 and the negative-electrode-plate pushing members 134 comprises a pushing bar 331 provided with an absorbing passage therein to communicate with an absorbing member 139, and a cushion member 333 installed at the pushing bar 331 to contact a positive electrode plate 102 or a negative electrode plate 104.

The operation of the lamination apparatus for an automated manufacturing system of a lithium secondary battery configured as above according to a preferred embodiment of the present invention will be described.

First, the power of the apparatus 330 is turned on, and data required for the control unit is set. Then, when a start button of the control unit is pressed, the separator 311 to which the adhesive is applied to both surfaces thereof is transported via the travel path and stopped to the laminating position of the travel path by a transporting unit (not shown).

Subsequently, the control unit causes the stacking member 110 of the lamination apparatus 330 to operate. Then, the positive-electrode-plate pressing plates 106 and the negative-electrode-plate pressing plates 108 are moved toward the positive electrode plates 102 and the negative electrode plates 104, respectively, to press the electrode plates 102 and 104. Meanwhile, the positive-electrode-plate pivoting members 122 and the negative-electrode-plate pivoting members 124 are pivoted by an angle of 90° from a state in which the positive-electrode-plate pivoting members 122 and the negative-electrode-plate pivoting members 124 face the travel path 313 so as to face the positive-electrode-plate magazine 116 and the negative-electrode-plate magazine 118, respectively. In addition, the positive-electrode-plate pushing members 132 and the negative-electrode-plate pushing members 134 are moved toward the positive electrode plate 102 and the negative electrode plate 104, and hold a batch of positive electrode plates 102 and negative electrode plates 104 which are stored in the positive-electrode-plate magazine 116 and the negative-electrode-plate magazine 118 by using respective absorbing forces.

Thereafter, after the pushing members 132 and 134 have held the respective electrode plates 102 and 104, the pressing forces applied to the positive-electrode-plate pressing plates 106 and the negative-electrode-plate pressing plates 108 are released, and the positive-electrode-plate pivoting members 122 and the negative-electrode-plate pivoting members 124 are pivoted, in reverse directions, to face the travel path 313. Thereafter, the positive-electrode-plate pushing members 132 and the negative-electrode-plate pushing members 134 press the respective positive electrode plates 102 and the respective negative electrode plates 104 to both surfaces of the separator 311 positioned along the travel path 313, simultaneously. Then, the positive electrode plates 102 and the negative electrode plates 104 are attached to both surfaces of the separator 311 by respective adhesion forces of the adhesive applied to both surfaces of the separator 311, and, at the same time, the absorbing forces applied to the positive-electrode-plate pushing members 132 and the negative-electrode-plate pushing members 134 are released.

Thereafter, the separator 311 to which the positive electrode plates 102 and the negative electrode plates 104 have been attached are moved by the transporting unit 340, and, subsequently, a new batch of the separator 311 to which the adhesive were applied are supplied to the lamination apparatus 330.

During these steps, the aligned state of the positive electrode plates 102 and the negative electrode plates 104 respectively stored in the positive-electrode-plate storing portions 112 and the negative-electrode-plate storing portions 114 may become improper due to pressing forces of the positive-electrode-plate pressing plates 106 and the negative-electrode-plate pressing plates 108 and pushing forces of the positive-electrode-plate pushing members 122 and the negative-electrode-plate pushing members 124. In this case, the positive-electrode-plate aligning member 142 and the negative-electrode-plate aligning member 144 are operated so that the positive electrode plates 102 and the negative electrode plates 104 positioned at the leading ends of the positive-electrode-plate magazine 116 and the negative-electrode-plate magazine 118 can be aligned by the positive-electrode-plate aligning bar 141 and the negative-electrode-plate aligning bar 143.

As described above, the lamination apparatus for an automated manufacturing system of a lithium secondary battery according to the present invention has the following advantages.

First, the overall efficiency of production thereof can be enhanced due to the employment of the automated lamination apparatus, and a rate of defective secondary batteries can be lowered.

Second, since the travel path of the separator is arranged to be horizontal, a row of positive electrode plates and a row of negative electrode plates, i.e., a batch of positive and negative electrode plates are attached and laminated to both surfaces of the separator at the same time, efficiency of the manufacturing operations and productivity of secondary batteries can be enhanced.

Third, since standardized, well-arranged magazines are employed, events in which electrode plates are inadequately aligned when the electrode plates are laminated to the separator can be prevented. Therefore, productivity of secondary batteries and quality thereof can be enhanced.

What is claimed is:

1. A lamination apparatus for an automated manufacturing system of a secondary lithium battery comprising:
   a frame;
   a stacking member provided with a plurality of positive-electrode-plate storing portions each of which a multitude of positive electrode plates are stored in, and which are disposed equidistantly, and a plurality of negative-electrode-plate storing portions each of which a multitude of negative electrode plates are stored in, and which are disposed equidistantly, and are installed at the frame to be asymmetrical to the positive-electrode-plate storing portions about a separator to which adhesive has been applied to in a predetermined pattern;
   pairs of pivoting members installed at the frame to pivot so as to face the positive-electrode-plate storing portions and the negative-electrode-plate storing portions, respectively; and
   pushing members installed to be linearly movable with respect to the respective pivoting members so as to approach the stacking member and the separator to attach the positive electrode plates and the negative electrode plates which are stored in the stacking member to the separator, wherein each of the pushing members comprise a cushion member which corresponds to one of the positive electrode plates and the neoative electrode plates, and is provided with a passage communicating with an absorbing member so as to hold the corresponding electrode plate stored in the stacking member with an absorbing force, and so as to attach to the separator.

2. The lamination apparatus for an automated manufacturing system of a secondary lithium battery claimed as in claim 1, wherein the stacking member further comprises pressing means for pressing the positive electrode plates and the negative electrode plates which are stored in the positive-electrode-plate storing portions and the negative-electrode-plate storing portions, respectively, against the respective pivoting members.

3. The lamination apparatus for an automated manufacturing system of a secondary lithium battery claimed as in claim 2, wherein each of the pressing means comprises:
   an elongated hole provided at each of the positive-electrode-plate storing portions and the negative-electrode-plate storing portions; and
   a pressing plate which has a pressing projection to be inserted into the elongated hole, and is installed at the frame to be linearly moved by a moving member.

4. The lamination apparatus for an automated manufacturing system of a secondary lithium battery claimed as in claim 3, wherein each of the pressing means further comprises an elastic member installed at the pressing projection so as to give an elastic force to corresponding one of the positive electrode plates and the negative electrode plates.

5. The lamination apparatus for an automated manufacturing system of a secondary lithium battery claimed as in claim 1, wherein the apparatus further comprises aligning members installed to be linearly movable with respect to the stacking member so as to align the positive electrode plates or the negative electrode plates stored in the stacking member.

6. A lamination apparatus for an automated manufacturing system of a secondary lithium battery comprising:
   a frame;
   a stacking member provided with a plurality of positive-electrode-plate storing portions each of which a multitude of positive electrode plates are stored in, and which are disposed equidistantly, and a plurality of negative-electrode-plate storing portions each of which a multitude of negative electrode plates are stored in, and which are disposed equidistantly, and are installed at the frame to be asymmetrical to the positive-electrode-plate storing portions about a separator to which adhesive has been applied to in a predetermined pattern;
   pairs of pivoting members installed at the frame to pivot so as to face the positive-electrode-plate storing portions and the negative-electrode-plate storing portions, respectively;
   pushing members installed to be linearly movable with respect to the respective pivoting members so as to approach the stacking member and the separator to attach the positive electrode plates and the negative electrode plates which are stored in the stacking member to the separator; and
   aligning members installed to be linearly movable with respect to the stacking member so as to align the positive electrode plates or the negative electrode plates stored in the stacking member.

* * * * *